United States Patent
Neighbour et al.

(10) Patent No.: US 12,355,922 B2
(45) Date of Patent: Jul. 8, 2025

(54) TRANSFERRING AN AUTHENTICATION STATE FROM A DIGITAL CHANNEL TO AN AGENT CHANNEL

(71) Applicant: Capital One Services, LLC, McLean, VA (US)

(72) Inventors: Erik Neighbour, Arlington, VA (US); Shashikiran Pargaonkar, Fairfax, VA (US); Jayanth Prathipati, Aldie, VA (US)

(73) Assignee: Capital One Services, LLC, McLean, VA (US)

( * ) Notice: Subject to any disclaimer, the term of this patent is extended or adjusted under 35 U.S.C. 154(b) by 371 days.

(21) Appl. No.: 18/065,936

(22) Filed: Dec. 14, 2022

(65) Prior Publication Data
US 2024/0205338 A1    Jun. 20, 2024

(51) Int. Cl.
*H04M 7/00* (2006.01)
*H04L 9/40* (2022.01)

(52) U.S. Cl.
CPC ...... *H04M 7/0078* (2013.01); *H04L 63/0838* (2013.01); *H04L 63/0846* (2013.01)

(58) Field of Classification Search
CPC ............ H04M 7/0078; H04L 63/0838; H04L 63/0846
USPC ........................................................ 370/356
See application file for complete search history.

(56) References Cited

U.S. PATENT DOCUMENTS

| | | | |
|---|---|---|---|
| 10,681,219 B2 | 6/2020 | Converse et al. | |
| 2013/0301820 A1* | 11/2013 | Williams | H04M 3/42195 379/201.01 |
| 2020/0396331 A1* | 12/2020 | Gupta | H04M 3/42042 |
| 2023/0336662 A1* | 10/2023 | Melendez | H04M 3/5183 |

* cited by examiner

*Primary Examiner* — Duc C Ho
(74) *Attorney, Agent, or Firm* — Harrity & Harrity, LLP

(57) ABSTRACT

In some implementations, a server device may obtain an indication of an incoming call, associated with a user device, to the call center service. The server device may perform a lookup in a database for information associated with the user device, wherein the information indicates the authentication status of a user that is established via the user device. The server device may determine whether an amount of time that the information has been stored in the database is less than or equal to a time threshold. The server device may generate an authentication token for the incoming call based on the authentication status and based on the amount of time being less than or equal to the time threshold.

20 Claims, 8 Drawing Sheets

TRANSFERRING AN AUTHENTICATION STATE FROM A DIGITAL CHANNEL TO AN AGENT CHANNEL

BACKGROUND

Verification or authentication is a security process that relies on the unique characteristics of individuals to verify that they are who they say they are. Verification systems compare received information or traits to stored, confirmed, authentic data in a database. If the received information or traits and stored data match, verification or authentication is confirmed. Typically, verification services are used to manage access to physical and digital resources, such as buildings, rooms, and computing devices. In contrast to identification, which uses characteristics (such as name, date of birth, and/or fingerprints or retina scans) to identify a person, verification is the use of characteristics of a person to verify that the person is who they claim to be.

SUMMARY

Some implementations described herein relate to a system for transferring an authentication state from a digital channel to an agent channel. The system may include one or more memories and one or more processors coupled to the one or more memories. The one or more processors may be configured to obtain, at a first time, an indication of an incoming call, associated with a user device, to a call center service that is associated with the agent channel. The one or more processors may be configured to determine, at a second time, whether an event associated with the user device Is stored in a database associated with the call center service. The one or more processors may be configured to determine whether an amount of time between the first time and the second time satisfies a time threshold. The one or more processors may be configured to perform an action to enable access, for the incoming call, to one or more services or functions associated with the call center service based on the authentication state and based on the amount of time satisfying the time threshold.

Some implementations described herein relate to a method of transferring an authentication status for a call center service. The method may include obtaining, by a server device, an indication of an incoming call, associated with a user device, to the call center service. The method may include performing, by the server device, a lookup in a database for information associated with the user device, where the information indicates the authentication status of a user that is established via the user device. The method may include determining, by the server device, whether an amount of time that the information has been stored in the database is less than or equal to a time threshold. The method may include generating, by the server device, an authentication token for the incoming call based on the authentication status and based on the amount of time being less than or equal to the time threshold.

Some implementations described herein relate to a non-transitory computer-readable medium that stores a set of instructions for a device. The set of instructions, when executed by one or more processors of the device, may cause the device to obtain, at a first time, an indication of an incoming communication, associated with a user device, to a customer service center. The set of instructions, when executed by one or more processors of the device, may cause the device to determine whether an event that occurred at a second time associated with the user device is stored in a database associated with the customer service center. The set of instructions, when executed by one or more processors of the device, may cause the device to determine whether an amount of time between the first time and the second time satisfies a time threshold. The set of instructions, when executed by one or more processors of the device, may cause the device to perform an action to enable access, for the incoming communication, to one or more services or functions associated with the customer service center based on the authentication state and based on the amount of time satisfying the time threshold.

DETAILED DESCRIPTION

Figure 1A:
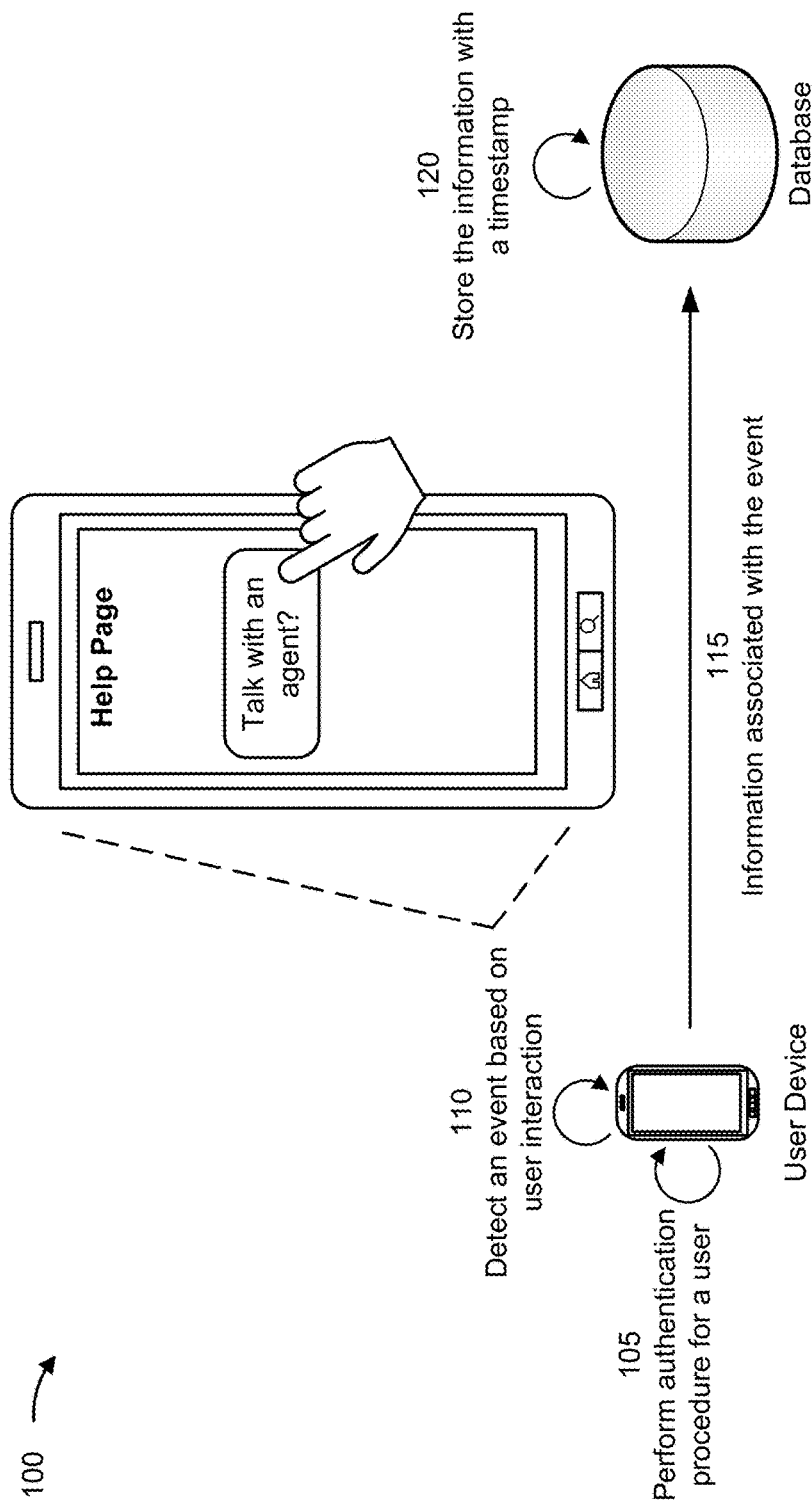
FIGS. 1A-1C are diagrams of an example associated with transferring an authentication state from a digital channel to an agent channel, in accordance with some embodiments of the present disclosure.

The following detailed description of example implementations refers to the accompanying drawings. The same reference numbers in different drawings may identify the same or similar elements.

A customer service center (e.g., a call center and/or chat interface) may be equipped to handle customer communications such as telephone communications, e-mail, messages, and/or live chat communications. The customer service center may route such communications to appropriate employees (e.g., service representatives) and/or platforms associated with an entity in order to provide a customer service or receive and/or respond to customer feedback regarding services provided by the entity. A call center allows users or individuals to communicate and/or engage with agents of an entity associated with the call center. The users may be consumers or customers that are seeking assistance with, or information associated with, a product or service that is offered by the entity. The agents may provide the assistance or information via voice calls that are managed by the call center (e.g., via a call management system that hosts calls between the users and the agents).

Verification or authentication is an identification and/or security process that uses one or more unique identifiers (e.g., name, date of birth, authenticated image, social security number, and/or biometric data) of an authorized user (e.g., an account owner or a device owner) to authenticate a user trying to gain access to physical and/or digital resources (e.g., an account or a device). The process may include receiving information associated with the user trying to gain access and comparing the information to stored data of the unique identifier of the authorized user. If there is a sufficient match, then a device may grant the user access to the physical and/or digital resources.

In some cases, a user may attempt to access physical and/or digital resources (e.g., an account or a device) via a digital channel (e.g., via an application executing on a user device or via a website). The user (e.g., via the user device) may perform an authentication procedure via the digital channel associated with an entity (e.g., on the user device) to verify the user's identity. However, while performing action(s) via the digital channel, a need to communicate with an agent of the entity may arise (e.g., the user may have a question or encounter a problem that requires input from, or an action to be performed by, the agent). Therefore, the user may place a call to a call center associated with the entity. However, a call center device associated with the agent may be required to perform another authentication procedure via an agent channel (e.g., over the phone with the agent) to verify the user's identity before enabling the agent to access and/or perform actions associated with the user. For example, the call center device may be unable to access information that is stored and/or obtained via the digital channel because the information (e.g., authentication information) may be stored externally on the user device and/or by an application executing on the user device.

This may consume time, processing resources, and/or network resources, among other examples, associated with performing the authentication procedure via the agent channel after the user has already performed an authentication procedure via the digital channel. However, the call center device may not have access to a reliable means or information to confirm or identify that the user has performed the authentication procedure via the digital channel. For example, a malicious actor may spoof an identifier or a phone number of the user device associated with the user (e.g., via caller ID spoofing to cause the telephone network to indicate to the receiver of a call that the originator of the call is a station other than the true originating station). Therefore, because malicious actors may be able to impersonate a user by providing an identifier or phone number of the user device when contacting a customer service center, it may be difficult or unreliable for a call center device to authenticate a user based on device information (e.g., from the digital channel). Therefore, the agent (e.g., via the call center device) may be required to perform an authentication procedure over the agent channel (e.g., over the phone), thereby consuming time, processing resources, and/or network resources, among other examples.

Some techniques and implementations described herein enable transferring an authentication state from a digital channel to an agent channel. For example, a server device may obtain an indication of an incoming call, associated with a user device, to a call center service that is associated with the agent channel. The user device may be associated with a digital channel. The server device may determine whether an event associated with the user device is stored in a database associated with the call center service. The event may indicate an authentication state of a user that is established via the digital channel and the user device. Additionally, the event may indicate that a function or operation associated with initiating a call to the call center has occurred via the digital channel and/or the user device. The authentication state may indicate whether the user is authenticated, a technique used to authenticate the user, and/or a level of authentication. The server device may determine whether an amount of time between obtaining the indication of the incoming call and a time at which the event occurred satisfies a threshold time. The server device may perform an action to enable access, for the incoming call, to one or more services or functions associated with the call center service based on the authentication state and based on the amount of time satisfying the threshold time.

In other words, a user device may stream an indication of an event that occurs via the digital channel and/or the user device to the database. The event may be stored with a timestamp by the database. When a call is incoming to the call center, the server device may check whether an event is stored in the database associated with the user device that is making the call and whether the event occurred close to (e.g., within a threshold time from) the call. For example, the event may include a link associated with calling the call center being selected on the user device and/or via the digital channel. The event may indicate that the user has been authenticated via the user device and/or the digital channel. If the event has occurred close to (e.g., within a threshold time from) the call, a likelihood that the call is legitimate and is from the actual user is high (e.g., because a malicious actor may not have knowledge of actions that are occurring on the user device and therefore may not call the call center close to when an event occurs). Therefore, the authentication state that was established via the digital channel may be reliably transferred to the agent channel.

As a result, the agent may not be required to perform a full authentication procedure with the user via the agent channel (e.g., over the phone). For example, the server device may enable the agent to access functions and/or applications that would have otherwise required the agent to perform an authentication procedure with the user over the agent channel, thereby conserving time, processing resources, and/or network resources, among other examples. Additionally, by transferring the authentication state based on an event occurring and based on the event occurring within a threshold time from a call to the call center, security associated with the user and/or an account of the user may be improved because a likelihood that the authentication state is transferred only when the call is from an authorized user is improved. For example, there may be a low likelihood of a malicious actor calling the call center to impersonate the user close to (e.g., within a threshold time from) an event (e.g., that is associated with initiating a call) occurring via the user device and/or the digital channel by an authenticated user.

Figure 1B:
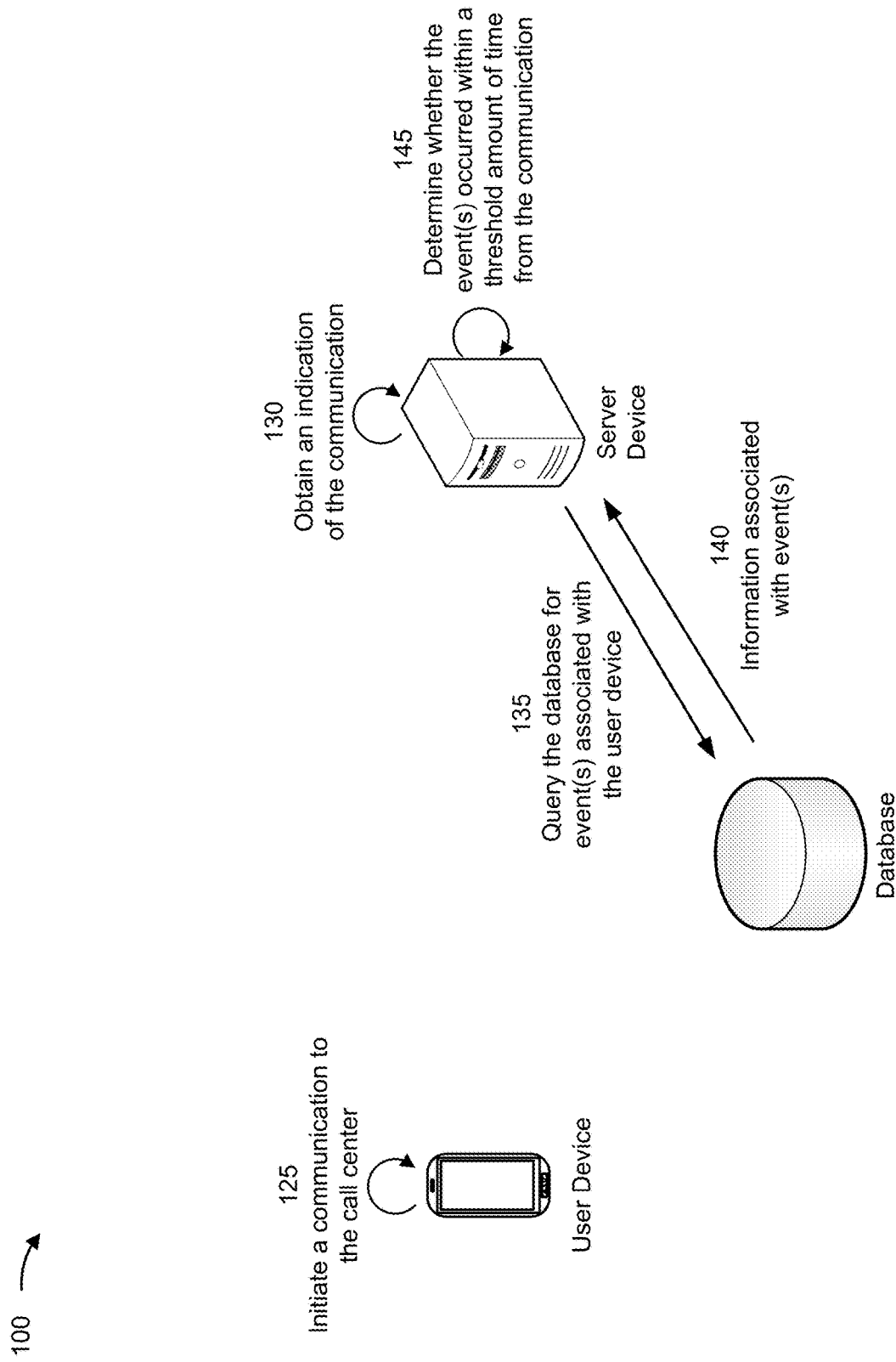
Figure 1C:
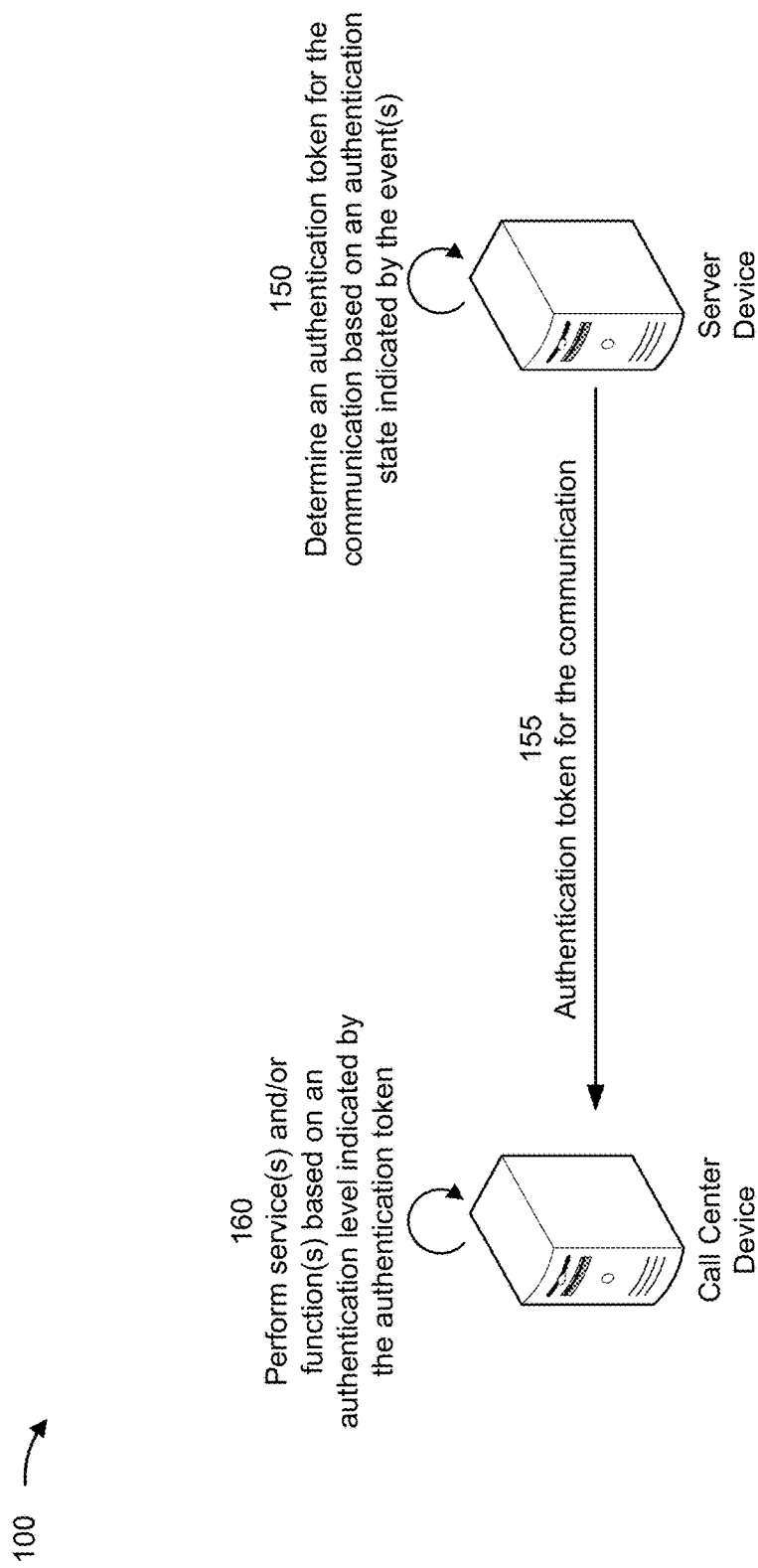

FIGS. 1A-1C are diagrams of an example 100 associated with transferring an authentication state from a digital channel to an agent channel. As shown in FIGS. 1A-1C, example 100 includes a user device, a server device, a call center device, and a database. These devices are described in more detail in connection with FIGS. 4 and 5.

As shown in FIG. 1A, a user may interact with the user device. The user device may be associated with a digital channel. The digital channel may include an application executing on the user device. As another example, the digital channel may include a webpage or website that is navigated to via a web browser executing on the user device. The digital channel may be associated with an entity (e.g., the application, webpage, and/or website may be associated with the entity). In some implementations, the entity may be associated with a customer service center (e.g., a call center and/or chat interface).

The customer service center and/or call center may be associated with an agent channel. As used herein, "agent channel" may refer to a communication channel over which a user communicates with an agent of the entity (e.g., a customer service representative associated with the customer service center). For example, the customer service center may be equipped to handle customer communications such as telephone communications, e-mail, messages, and/or live chat communications. "Call center" and "customer service center" may be used interchangeably herein (e.g., a call center may be equipped to communicate with users via other forms of communication in addition to telephone calls). Although some examples are described herein in connection with calls (e.g., telephone communications) to the customer service center, implementations described herein may be similarly used to transfer an authentication state from the digital channel to the agent channel in connection with other types of communications to the customer service center, such as e-mail, text messages, and/or live chat communications.

As shown by reference number 105, the user device may perform an authentication procedure to authenticate a user and/or verify a user's identity. For example, the authentication procedure may be based on an authentication factor, such as a knowledge factor (e.g., something the user knows, such as a password), a possession factor (e.g., something the user has, such as a device, a hardware token, and/or a one-time password (OTP)), and/or an inherence factor (e.g., something inherent to the user, such as a biometric feature), among other examples. In some implementations, the authentication procedure may vary based on the resources and/or functions that the user attempts to access (e.g., resources and/or functions associated with a higher level of sensitivity may be associated with a more secure authentication procedure). In some implementations, the authentication procedure may be based on a single authentication factor. In other implementations, the authentication procedure may be based on multiple authentication factors (e.g., multi-factor authentication).

For example, the user device may obtain information (e.g., that is provided by, or associated with, the user). For example, the user device may obtain a username and password combination, an OTP, biometric scan data, a token, and/or other information to be used to authenticate the user. The user device may compare the information to one or more authentication factors stored by the user device. For example, the user device may determine whether a password provided by a user matches a stored password associated with an account. As another example, the user device may compare minutiae points of a biometric scan of a feature of the user to minutiae points of stored biometric data (e.g., if a quantity of matching minutiae points satisfies a threshold, then the user device may determine that the user is authenticated). In some implementations, the authentication procedure may be performed via the digital channel. For example, an application executing on the user device and/or a website may perform the authentication procedure.

The user device may determine whether the user is authenticated based on performing the authentication procedure. For example, the user device may determine that the user is authenticated. As a result, the user device may enable the user to access resources, services, and/or functions provided via the digital channel. For example, the user device may enable the user to access an application executing on the user device and/or a webpage based on the user device determining that the user is authenticated (e.g., based on performing the authentication procedure). The user device may store an authentication state associated with the digital channel and the user. For example, the user device may store an indication that the user has been successfully authenticated via the digital channel (e.g., the user device may store an authentication token or other identifier of the authentication state of the user). The user device may perform one or more operations and/or functions via the digital channel based on successfully authenticating the user.

As shown by reference number 110, the user device may detect an event. For example, the user device may detect the event based on a user interaction with the user device and/or based on an operation occurring via the digital channel. In some implementations, the event may be associated with initiating a communication (e.g., a call or other communication) to an agent channel (e.g., to a call center). For example, the event may be associated with a user interaction with an application executing on the user device. The user interaction may be associated with a user input associated with a link that causes an incoming call or communication to the call center service to be initiated. In some implementations, the link may be a deep link.

A deep link may be a hypertext link to a specific page or function of an application or web page. For example, a user may select a link that causes the user device to perform specific functionality on a specific screen in an application. For example, the digital channel (e.g., an application executing on the user device or a webpage) may include a deep link that, when selected by the user, causes the user device to initiate a communication (e.g., a phone call or another communication) to the call center associated with the entity. As shown in FIG. 1A, the digital channel may be associated with a link (e.g., shown as an input option "Talk with an agent?"). The user device may detect the event based on the user selecting the option (e.g., selecting the deep link). For example, the user device may detect the event based on the user clicking or otherwise selecting the "Talk with an agent?" option depicted in FIG. 1A. As another example, the user device may detect the event based on the link (e.g., the deep link) being displayed by the user device. For example, the user device may detect the event based on the user device displaying the "Talk with an agent?" option depicted in FIG. 1A.

In other words, the user device may detect an event based on the user being prompted in the digital channel to initiate a communication (e.g., a call or another type of communication) to the call center. Additionally, or alternatively, the user device may detect an event based on the user selecting an option (e.g., a deep link) via the digital channel that causes the user device to initiate a communication to the call center.

In some implementations, based on detecting the event, the user device (and/or the server device) may generate a code to facilitate transferring the authentication state or status (e.g., established via the digital channel) to the agent channel associated with the call center. For example, the code may be a time-based one-time personal identification number or a time-based one-time password. For example, the code may be valid for an amount of time (e.g., 30 seconds, 1 minute, or another amount of time). In some implementations, the user device may link the code to the deep link that causes the user device to initiate the communication to the call center. This may cause the user device to provide the code as part of the communication when the user selects the option and/or the deep link. Additionally, or alternatively, the user device may display the code based on detecting the event.

As shown by reference number 115, the user device may store information associated with the event (e.g., a detected event) in the database. For example, the user device may stream the information associated with the event to the database based on detecting the event. In some implementations, the information may include an indication of the authentication state (e.g., an authentication status) of the user that is established via the digital channel and the user device (e.g., as described above). For example, the authentication state may indicate whether the user is authenticated, a technique used to authenticate the user (e.g., an indication of authentication factor(s) used to authenticate the user), and/or a level of authentication (e.g., an indication of a quantity of authentication factors used to authenticate the user, where a higher quantity of authentication factors indicates a higher level of authentication), among other examples.

In some implementations, the information may include an indication of the event. For example, the information may include an indication of a type of event that was detected by the user device. The type of event may include the user device displaying an option for the user to initiate a communication to the agent channel (e.g., to the call center), and/or the user device receiving a user input selecting an option that causes the user device to initiate the communication, among other examples. In some implementations, the information may include an indication of a time at which the event was detected by the user device.

In some implementations, the information may include an identifier of the user device and/or a phone number associated with the user device. In some implementations, the user device (and/or an application executing on the user device) may determine the phone number associated with the user device via using a silent mobile authentication technique. The silent mobile authentication technique may also be referred to as a silent mobile verification technique. The silent mobile authentication technique may verify the phone number of the user device by comparing the phone number stored by the user device to data stored by a mobile network operator (e.g., a mobile network operator that provides or manages the phone number and/or a wireless network used by the user device). For example, the user device (e.g., and/or an application executing on the user device) may transmit, to a mobile network operator device, an indication of parameters for silent mobile authentication, such as a phone number stored by the user device, a user device internet protocol (IP) address, an identifier of the user device, and/or other parameters. The mobile network operator device may compare the phone number provided by the user device to a phone number stored by the mobile network operator device. The mobile network operator device may transmit, and the user device may receive (e.g., and/or the application may receive) an indication of whether the phone number stored by the user device is verified. This may improve security associated with the user by enabling the user device and/or the application to determine whether a phone number stored and/or used by the user device is legitimate (e.g., is not spoofed). Additionally, this may ensure that the phone number stored in connection with information associated with the event is a valid and/or legitimate phone number associated with the user device.

As shown by reference number 120, the information associated with the event may be stored in the database with a timestamp. The timestamp may be an indication of a time at which the event was stored in the database. As another example, the timestamp may be an indication of a time at which the event was detected by the user device. The timestamp may enable the server device to determine a time at which the event occurred and/or was stored. This may enable the server device to determine whether a communication to the call center occurred proximate in time to the event, thereby improving a determination by the server device as to whether an authentication state of the user should be transferred from the digital channel to the agent channel, as described in more detail elsewhere herein.

As shown in FIG. 1B, and by reference number 125, the user device may initiate a communication to the call center. For example, the user device may initial a call (e.g., a telephone communication) to the call center. As another example, the user device may transmit another type of communication intended for the call center, such as an email communication, a text message, and/or a chat communication, among other examples. As shown by reference number 130, the server device may obtain an indication of the communication. For example, the server device may be a management device for the call center (e.g., a call center management device). When a communication (e.g., a call) is made to a phone number associated with the call center, a network device may provide an indication to the server device of the incoming communication.

For example, the server device may obtain an indication of an identifier and/or a phone number associated with the user device that initiates the communication. For example, the network device may transmit, and the server device may receive, an indication of a phone number of a source device (e.g., the user device) associated with the communication. In other examples, the server device may receive an indication of another identifier of the user device, such as an IP address.

The server device may determine whether there is an event stored in the database that is associated with the user device. For example, as shown by reference number 135, the server device may query the database using an identifier of the user device and/or a phone number associated with the user device. For example, the server device may transmit, to the database, a request for information of events that are associated with the user device. In some implementations, the server device may search the database using the identifier and/or the phone number associated with the incoming communication (e.g., associated with the user device). For example, entries in the database may be associated with, or mapped to, phone number and/or device identifiers.

The server device and/or the database may identify whether any entries stored by the database include the identifier and/or the phone number associated with the incoming communication (e.g., associated with the user device). In other words, the server device may perform a lookup in a database for information associated with the user device. The server device may determine whether an event (e.g., associated with the communication and/or the user device) is stored in the database based on querying the database. If the server device and/or the database identifies that no entries stored by the database include the identifier and/or the phone number associated with the incoming communication (e.g., if the lookup returns a miss), then the server device may determine that no events associated with the user device (e.g., associated with the incoming communication) have occurred. In such examples, the server device and/or the call center device may not transfer an authentication state to the agent channel for the communication. In other words, in such examples, the server device and/or the call center device may perform an authentication procedure via the agent channel to authenticate a user associated with the communication.

If the server device and/or the database identifies that one or more entries stored by the database include the identifier and/or the phone number associated with the incoming communication (e.g., if the lookup returns a hit), then the server device may determine that an event associated with the communication and/or the user device has occurred. In such examples, the server device may determine that there is a possibility of transferring an authentication state or an authentication status for the communication (e.g., without performing an authentication procedure via the agent channel). As shown by reference number 140, the server device may receive, from the database, information associated with the one or more events that are identified by querying the database. For example, the database may return the information stored in the database associated with the one or more events.

As shown by reference number 145, the server device may determine whether the one or more events occurred within a threshold amount of time from the server device obtaining the indication of the communication. For example, the server device may determine whether an amount of time from obtaining the indication of the incoming communication and a time at which the event occurred satisfies a time threshold. As another example, the server device may determine whether an amount of time that the information has been stored in the database is less than or equal to the time threshold. The time threshold may be 30 seconds, 1 minute, 3 minutes, 5 minutes, 15 minutes, or another amount of time. For example, the server device may determine an amount of time from the time at which the indication of the incoming call is obtained and a time indicated by a timestamp associated with the event. If the amount of time satisfies the time threshold, then the server device may determine that there is a possibility of transferring an authentication state or an authentication status for the communication (e.g., without performing an authentication procedure via the agent channel). If the amount of time does not satisfy the time threshold, then the server device may determine that the server device and/or the call center device is not permitted to transfer an authentication state to the agent channel for the communication. In other words, in such examples, the server device and/or the call center device may perform an authentication procedure via the agent channel to authenticate a user associated with the communication.

For example, if the amount of time does not satisfy the time threshold, a likelihood that the user associated with the call and the user associated with the event are the same user may be decreased. Therefore, in such examples, the server device and/or the call center device may not rely on the authentication procedure performed via the digital channel to authenticate the user associated with the communication. As a result, by checking that the event occurred close to a time of the communication, security associated with the user may be increased (e.g., because if the event does not occur close to a time of the communication, a separate authentication procedure may be performed for the communication to verify an identifier of a user associated with the communication).

In some implementations, the time threshold may be based on a type of event. For example, if the event is associated with a prompt or option for initiating the communication being displayed on the user device, then the event may be associated with a first time threshold. If the event is associated with a user input selecting the prompt or the option, then the event may be associated with a second time threshold.

In some implementations, information associated with an event may be erased or otherwise removed from the database after an amount of time associated with the time threshold. For example, the database and/or the server device may determine whether an amount of time that information associated with an event has been stored in the database is greater than the amount of time associated with the time threshold. If the amount of time is greater than the amount of time associated with the time threshold, then the server device and/or the database may erase and/or otherwise remove the information from the database. This may ensure that information associated with an event that occurred more than the amount of time associated with the time threshold is not provided to the server device when the server device obtains an indication of an incoming communication. This may conserve network resources and/or processing resources that would have otherwise been used by the server device to determine whether an amount of time that the information has been stored in the database is less than or equal to the time threshold. Additionally, this may increase security associated with the user because a chance that the server device incorrectly determines that the amount of time that the information has been stored in the database is less than or equal to the time threshold is reduced. Further, this may conserve memory resources that would have otherwise been used to store information associated with events that occurred more than the amount of time associated with the time threshold.

As shown in FIG. 1C, the server device may determine that an authentication state and/or authentication status (e.g., indicated by the one or more events associated with the communication and/or the user device) is to be transferred to the agent channel for the communication. For example, the server device may determine that the authentication state is to be transferred to the agent channel based on determining that an amount of time from obtaining the indication of the incoming communication and the time at which the event occurred (and/or was stored in the database) satisfies the time threshold.

Additionally, or alternatively, the server device may determine that the authentication state is to be transferred to the agent channel based on determining that a code provided by the incoming communication matches an authentication code stored by the server device. For example, as described above, based on detecting the event, the user device (and/or the server device) may generate an authentication code to facilitate transferring the authentication state or status (e.g., established via the digital channel) to the agent channel associated with the call center. The authentication code may be a unique identifier. For example, the authentication code may be a time-based one-time personal identification number or a time-based one-time password. The server device may determine whether a code provided by the incoming communication matches an authentication code and/or that the authentication code is valid (e.g., because the authentication code may only be valid for a certain amount of time). In other words, even if the code provided by the incoming communication matches the authentication code, the server device may determine that the authentication code is not valid based on the amount of time (e.g., from generating the authentication code) expiring.

For example, the server device may obtain an indication of a code associated with the incoming communication (e.g., a first code provided as part of the incoming call). The server device may compare the first code to a second code (e.g., the authentication code) that is associated with the user device. The server device may determine that an authentication state and/or authentication status (e.g., indicated by the one or more events associated with the communication and/or the user device) is to be transferred to the agent channel for the communication based on the first code (e.g., provided via the incoming communication) matching the second code (e.g., matching the authentication code) and/or based on the second code being valid.

Additionally, or alternatively, the server device may determine that the authentication state is to be transferred to the agent channel based on determining that the incoming communication is associated with a secure connection. For example, the secure connection may be associated with the application executing on the user device. As an example, the secure connection may be a voice over internet protocol (VoIP) connection associated with the digital channel. The VoIP connection may enable information associated with the user device and/or the user to be provided to the server device of a trusted connection that is associated with the entity. This may increase security associated with the user and/or the communication because additional context and/or information may be provided to the server device using a VoIP connection (e.g., as compared to other communication channels, such as a telephone call).

Additionally, or alternatively, the server device may determine that the authentication state is to be transferred to the agent channel based on determining that the phone number associated with the incoming call matches a phone number stored in the database and/or by the server device. For example, as described above, a phone number of a user device may be verified with a mobile network operator (e.g., via a silent mobile authentication technique or another technique). The server device may determine whether the phone number from which the incoming communication originated matches the verified phone number of the user device. For example, the information associated with an event may indicate a first phone number associated with the event. The server device may compare the first phone number to a second phone number associated with the incoming communication. If the first phone number matches the second phone number, then the server device may determine that the authentication state is to be transferred to the agent channel. If the first phone number does not match the second phone number, then the server device may determine that the authentication state is not to be transferred to the agent channel.

Additionally, or alternatively, the server device may determine that the authentication state is to be transferred to the agent channel based on determining that a phone number to which the incoming communication was made (e.g., a phone number associated with the call center) is included in one or more permitted phone numbers. For example, the incoming communication may be made to a phone number from a set of phone numbers associated with the call center service. The server device may determine that the authentication state is to be transferred to the agent channel based on the phone number being a phone number designated for use by the user device or an application executing on the user device. In other words, the call center may be associated with multiple phone numbers. The server device may designate one or more phone numbers for use by the user device and/or the application. The one or more phone numbers may be displayed by the user device and/or deep-linked to an option displayed by the user device. Therefore, if an incoming communication is made to one of the one or more designated phone numbers, a likelihood that the user of the incoming communication is the same as the user of the user device may be improved, thereby increasing security of an account associated with the user. If the phone number to which the incoming communication is made is included in the one or more designated phone numbers, then the server device may determine that the authentication state is to be transferred to the agent channel. If the phone number to which the incoming communication is made is not included in the one or more designated phone numbers, then the server device may determine that the authentication state is not to be transferred to the agent channel.

As shown by reference number 150, the server device may determine an authentication token for the communication based on an authentication state indicated by the one or more events. In other words, the server device may determine an authentication token for the incoming communication based on an authentication state that is established via the digital channel and/or via the user device (e.g., based on determining that the authentication state is to be transferred to the agent channel, as described in more detail elsewhere herein). The authentication token may indicate an authentication level (e.g., an authentication token level) that is associated with the call. An authentication level may indicate a level of access that is permitted to resources and/or functions associated with an account or a user.

In some implementations, the authentication level granted by the server device for the incoming communication may be based on the authentication state that is established via the digital channel (e.g., as described in connection with FIG. 1A). For example, if the authentication procedure performed via the digital channel is a more secure authentication procedure (e.g., a multi-factor authentication procedure), then the authentication level granted by the server device for the incoming communication may be higher (e.g., may enable access to more features, resources, and/or services via the agent channel). If the authentication procedure performed via the digital channel is a less secure authentication procedure (e.g., a single factor authentication procedure), then the authentication level granted by the server device for the incoming communication may be lower (e.g., may enable access to fewer features, resources, and/or services via the agent channel).

As shown by reference number 155, the server device may provide, to the call center device, an indication of the authentication token for the communication. For example, the call center device may be a device used by an agent to perform operations, functions, and/or services associated with the incoming communication. In some implementations, the information associated with the event may include context information associated with the incoming call. For example, the context information may include activity that was occurring on the digital channel (e.g., on the user device) when, or before, the event occurred. For example, the context information may indicate a page that was open when, or before, the event occurred. The context information may provide valuable context for an incoming communication. Therefore, in addition to providing the authentication token, the server device may provide an indication of the context information to the call center device.

As shown by reference number 160, the call center device may perform one or more services and/or functions based on the authentication level indicated by the authentication token (e.g., without performing an authentication procedure via the agent channel). For example, the server device may perform an action to enable access, for the incoming communication, to one or more services or functions associated with the call center service based on the authentication state. Furthermore, the server device may perform such action to enable access based on determining that the authentication state is to be transferred to the agent channel, as described in more detail elsewhere herein. In other words, the call center device may enable an agent to access one or more operations, functions, and/or services (e.g., without performing an authentication procedure) based on obtaining the authentication token associated with the incoming call. As a result, the agent may not be required to perform a full authentication procedure with the user via the agent channel (e.g., over the phone). For example, the server device may enable the agent to access functions and/or applications that would have otherwise required the agent to perform an authentication procedure with the user over the agent channel, thereby conserving time, processing resources, and/or network resources, among other examples.

As indicated above, FIGS. 1A-1C are provided as an example. Other examples may differ from what is described with regard to FIGS. 1A-1C.

Figure 2:
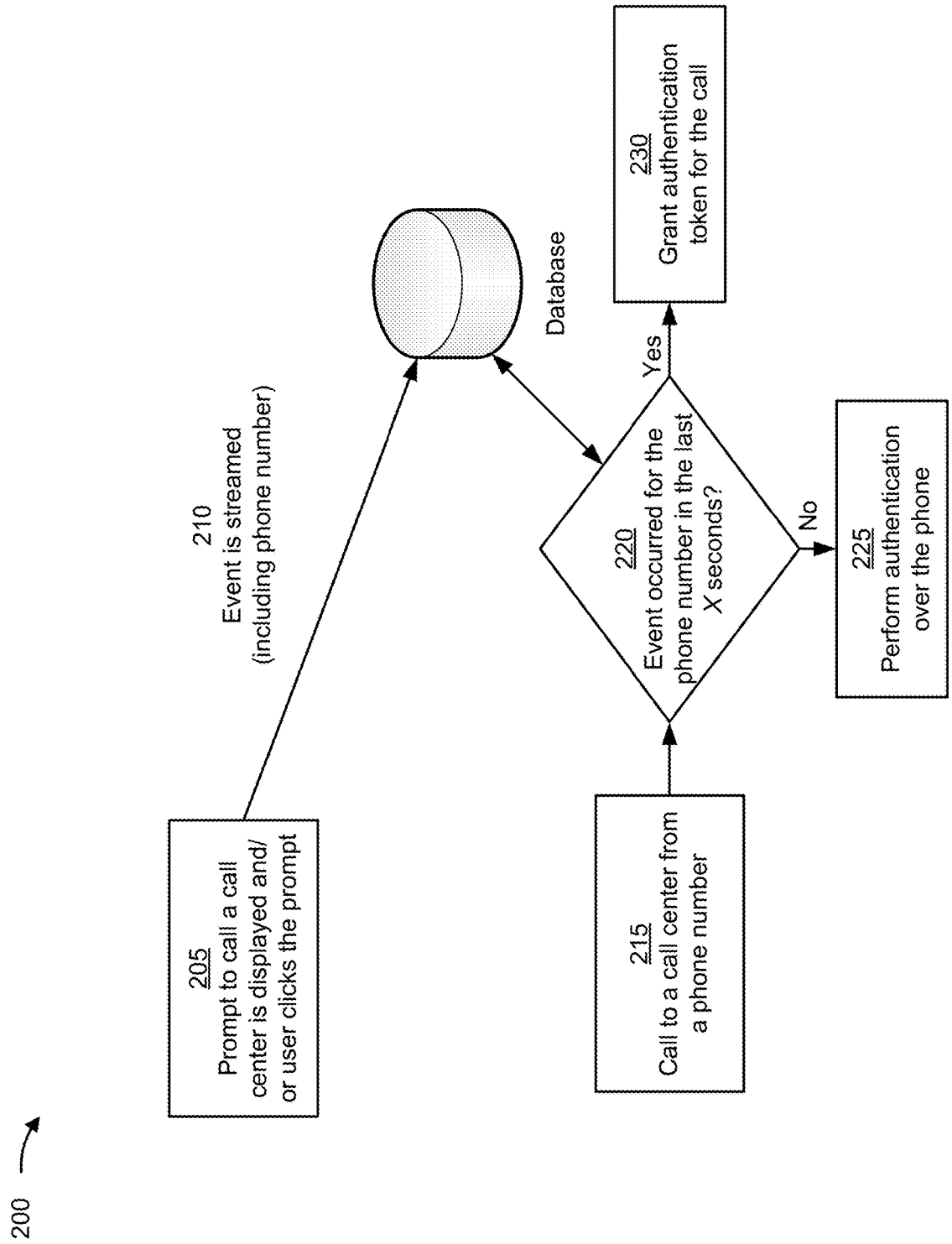
FIG. 2 is a diagram of an example process associated with transferring an authentication state from a digital channel to an agent channel, in accordance with some embodiments of the present disclosure.

FIG. 2 is a diagram of an example process 200 associated with transferring an authentication state from a digital channel to an agent channel. The blocks, steps, and/or operations of process 200 may be performed by one or more of the devices described above in connection with FIGS. 1A-1C, such as the server device, the user device, the call center device, and/or the database.

As shown in FIG. 2, the process 200 may include a prompt being displayed (e.g., via a user device) for a user to call a call center and/or detecting that a user clicks or selects the prompt (block 205). For example, process 200 may include detecting an event associated with transferring an authentication state from a digital channel to an agent channel, as described in more detail elsewhere herein. The process 200 may include streaming an event (e.g., information associated with the event) to a database (block 210). For example, the information may include a phone number associated with the user device. In some implementations, the information associated with the event may include an indication of an authentication status that is established via the digital channel.

The process 200 may include obtaining an indication of a call to a call center from a phone number (block 215). For example, a call may be placed to the call center from a phone number. The process 200 may include determining whether an event has occurred for the phone number within the last X seconds (block 220). For example, X seconds may be the time threshold as described above in connection with FIGS. 1A-1C. In some implementations, the database may be queried using the phone number associated with the call. If the database includes an indication of an event associated with the phone number, then the server device may determine whether the event occurred within X seconds from the call being made.

If there is not an event stored in the database associated with the phone number that occurred within X seconds from the call being made (e.g., No), then the process 200 may include performing an authentication procedure for the call over the phone (e.g., via the agent channel) (block 225). If there is an event stored in the database associated with the phone number that occurred within X seconds from the call being made (e.g., Yes), then the process 200 may include granting an authentication token (e.g., associated with an authentication level) for the call (block 230). For example, because a user and/or account has been authenticated via the digital channel (e.g., associated with a phone number) and because information associated with an event is stored in the database associated with the phone number that occurred within X seconds from the call being made, the authentication from the digital channel may be used to authenticate the call that occurs via the agent channel, as described in more detail elsewhere herein.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel. The process 200 is an example of one process that may be performed by one or more devices described herein. These one or more devices may perform one or more other processes based on operations described herein, such as the operations described in connection with FIGS. 1A-1C. Moreover, while the process 200 has been described in relation to the devices and components of the preceding figures, the process 200 can be performed using alternative, additional, or fewer devices and/or components. Thus, the process 200 is not limited to being performed with the example devices, components, hardware, and software explicitly enumerated in the preceding figures.

Figure 3:
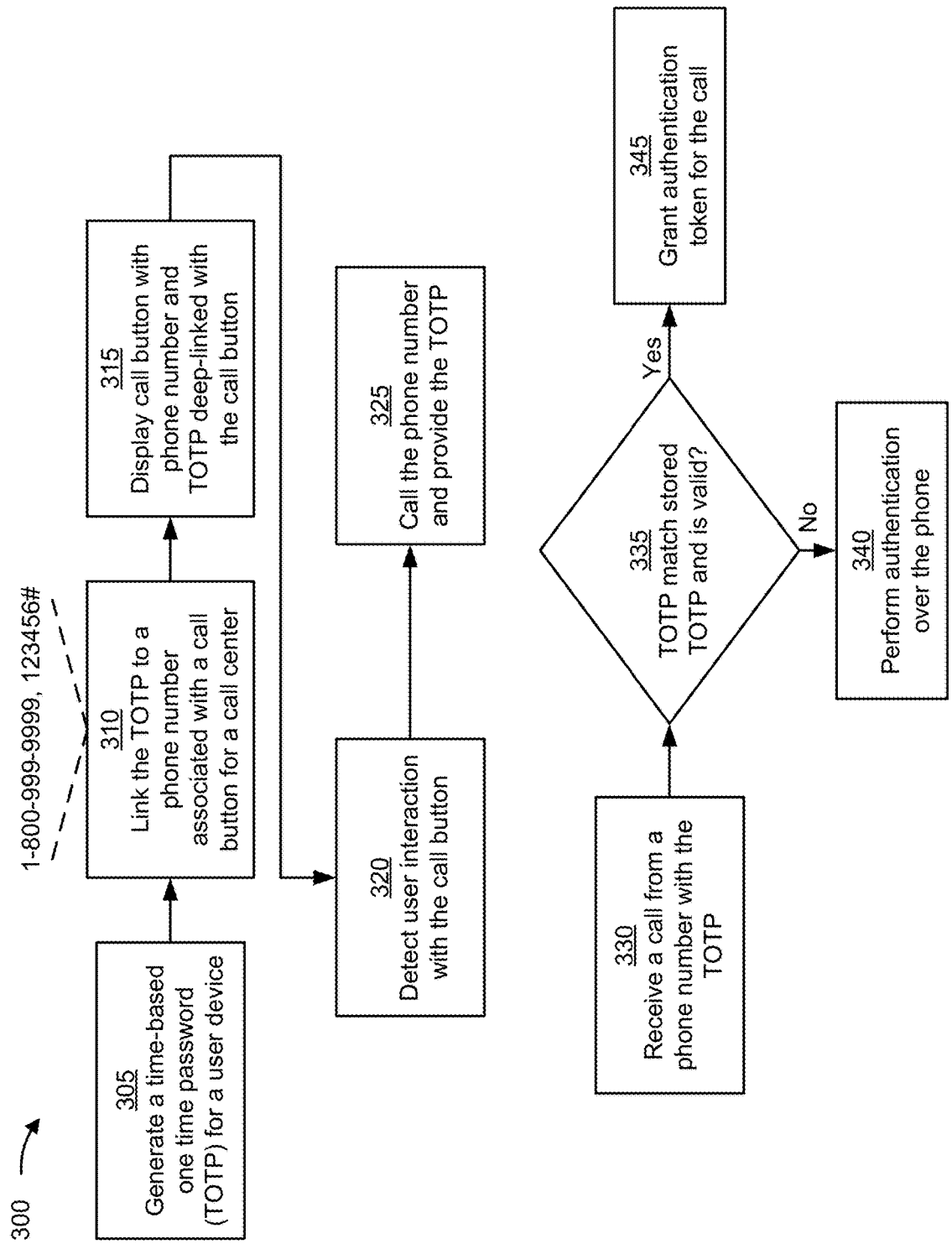
FIG. 3 is a diagram of an example process associated with transferring an authentication state from a digital channel to an agent channel, in accordance with some embodiments of the present disclosure.

FIG. 3 is a diagram of an example process 300 associated with transferring an authentication state from a digital channel to an agent channel. The blocks, steps, and/or operations of process 300 may be performed by one or more of the devices described above in connection with FIGS. 1A-1C, such as the server device, the user device, the call center device, and/or the database.

As shown in FIG. 3, the process 300 may include generating a time-based one-time password (TOTP) for a user device (block 305). For example, the TOTP may be a unique identifier that is valid for a certain amount of time. For example, after such certain amount of time, the TOTP may be considered to be invalid even if the correct TOTP is provided. In some implementations, the TOTP may be generated based on detecting an event and/or based on detecting that a user has been authenticated via a digital channel, as described in more detail elsewhere herein. The process 300 may include linking the TOTP to a phone number associated with a call button (e.g., an input option or a deep link) for a call center (block 310). For example, the phone number for the call center may be 1-900-999-9999 and the TOTP may be 123456# as shown in FIG. 3. The TOTP may be linked to the call button such that when a user selects the call button, the phone number associated with the call center is dialed and the TOTP is provided.

The process 300 may include displaying the call button with the phone number and the TOTP deep-linked with the call button (block 315). In some implementations, displaying the call button may be an example of an event, as described elsewhere herein. The process 300 may include detecting a user interaction with the call button (block 320). For example, a user input selecting the call button may be detected. The process 300 may include calling the phone number and providing the TOTP (block 325).

The process 300 may include receiving a call from a phone number and obtaining a TOTP associated with the call (block 330). For example, the TOTP may be provided as an input associated with a phone call. The process 300 may include determining whether the provided TOTP matches a stored TOTP and determining whether the TOTP is valid (block 335). For example, the process 300 may include comparing the TOTP provided via the call to a TOTP that is associated with a phone number associated with the call. Additionally, if the TOTP provided via the call matches the TOTP associated with the phone number, then the process

300 may include determining whether the TOTP is valid (e.g., based on an amount of time associated with the TOTP).

If the provided TOTP does not match the stored TOTP or the TOTP is not valid (e.g., No), then the process 300 may include performing an authentication procedure for the call over the phone (e.g., via the agent channel) (block 340). If the provided TOTP does match the stored TOTP and the TOTP is not valid (e.g., No), then the process 300 may include granting an authentication token (e.g., associated with an authentication level) for the call (block 345). For example, because a user and/or account has been authenticated via the digital channel (e.g., associated with a phone number) and because a valid TOTP is provided with the call, the authentication from the digital channel may be used to authenticate the call that occurs via the agent channel, as described in more detail elsewhere herein.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel. The process 300 is an example of one process that may be performed by one or more devices described herein. These one or more devices may perform one or more other processes based on operations described herein, such as the operations described in connection with FIGS. 1A-1C. Moreover, while the process 300 has been described in relation to the devices and components of the preceding figures, the process 300 can be performed using alternative, additional, or fewer devices and/or components. Thus, the process 300 is not limited to being performed with the example devices, components, hardware, and software explicitly enumerated in the preceding figures.

Figure 4:
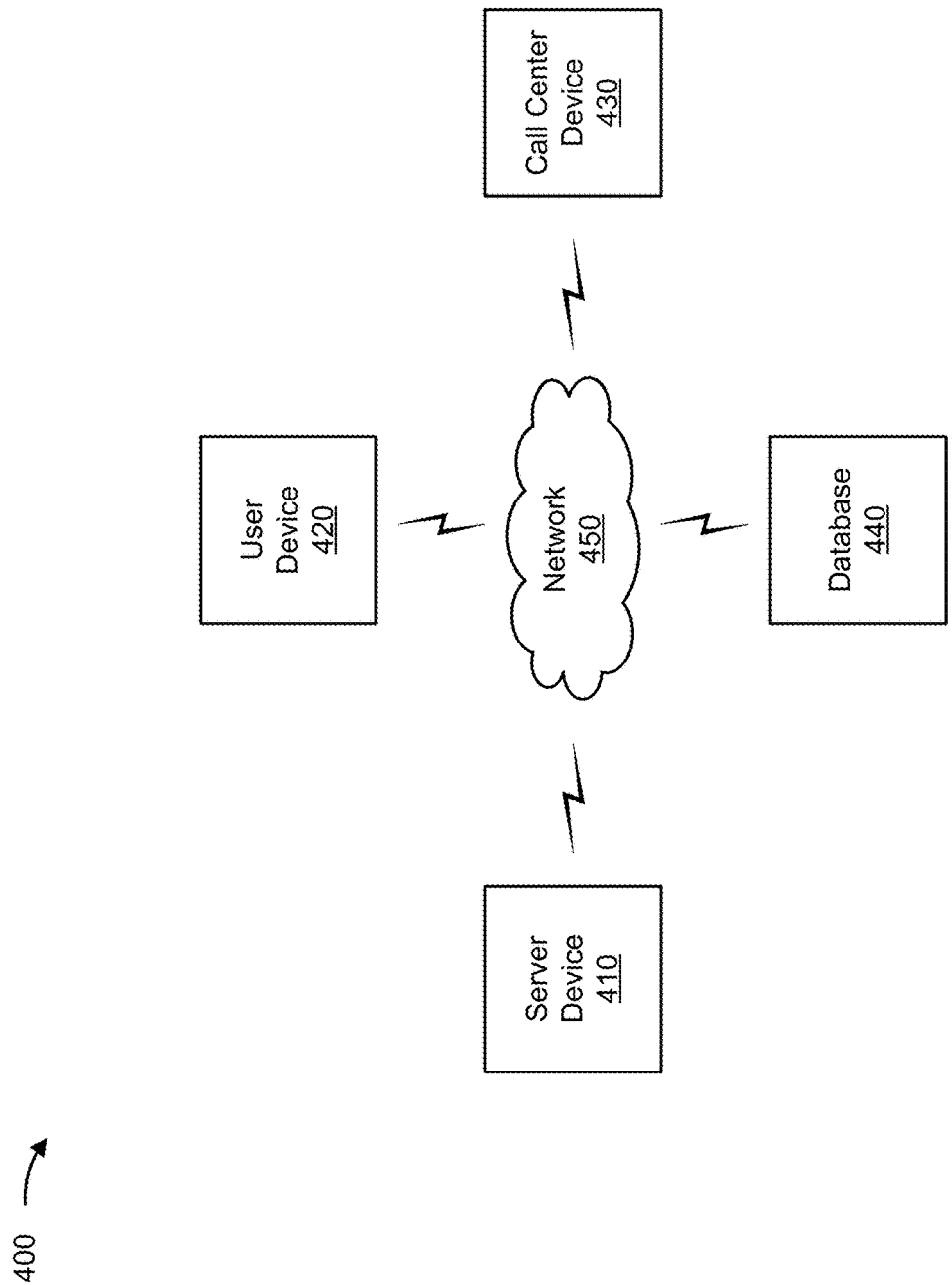
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a server device 410, a user device 420, a call center device 430, a database 440, and a network 490. Devices of environment 400 may interconnect via wired connections, wireless connections, or a combination of wired and wireless connections.

The server device 410 may include one or more devices capable of receiving, generating, storing, processing, providing, and/or routing information associated with transferring an authentication state from a digital channel to an agent channel, as described elsewhere herein. The server device 410 may include a communication device and/or a computing device. For example, the server device 410 may include a server, such as an application server, a client server, a web server, a database server, a host server, a proxy server, a virtual server (e.g., executing on computing hardware), or a server in a cloud computing system. In some implementations, the server device 410 may include computing hardware used in a cloud computing environment.

The user device 420 may include one or more devices capable of receiving, generating, storing, processing, and/or providing information associated with transferring an authentication state from a digital channel to an agent channel, as described elsewhere herein. For example, the user device 420 may host or include the digital channel. The user device 420 may include a communication device and/or a computing device. For example, the user device 420 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The call center device 430 may include one or more devices capable of receiving, generating, storing, processing, providing, and/or routing information associated with transferring an authentication state from a digital channel to an agent channel, as described elsewhere herein, as described elsewhere herein. For example, the call center device 430 may host or include the agent channel. The call center device 430 may include a communication device and/or a computing device. For example, the call center device 430 may include a server, such as an application server, a client server, a web server, a database server, a host server, a proxy server, a virtual server (e.g., executing on computing hardware), or a server in a cloud computing system. In some implementations, the call center device 430 may include a laptop computer, a tablet computer, a desktop computer, a wireless communication device, or a mobile phone, among other examples. In some implementations, the call center device 430 may include computing hardware used in a cloud computing environment.

The database 440 may include one or more devices capable of receiving, generating, storing, processing, and/or providing information associated with transferring an authentication state from a digital channel to an agent channel, as described elsewhere herein. The database 440 may include a communication device and/or a computing device. For example, the database 440 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the database 440 may store information associated with one or more events associated with transferring an authentication state from the digital channel to the agent channel, as described elsewhere herein.

The network 450 may include one or more wired and/or wireless networks. For example, the network 450 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 450 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
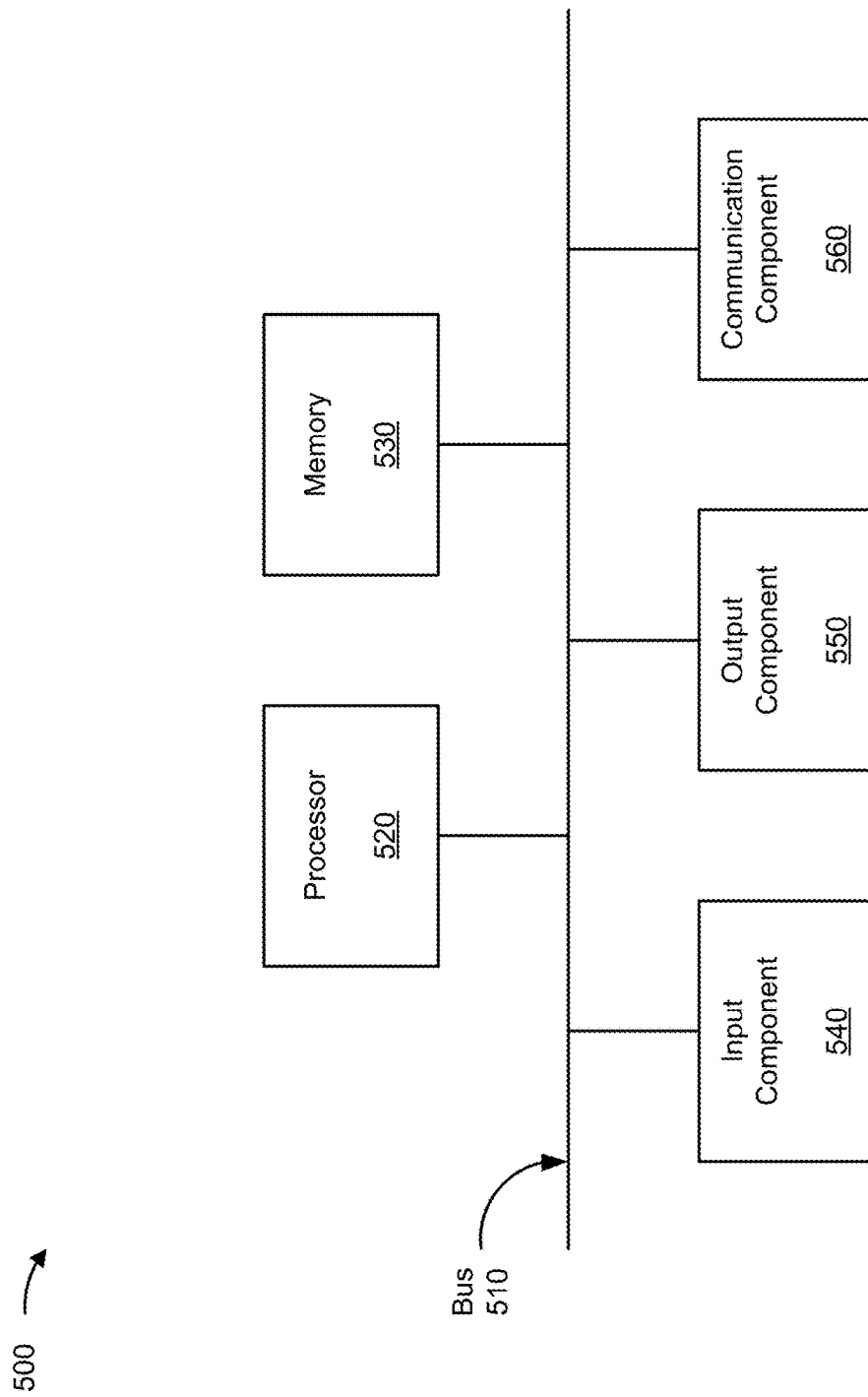
FIG. 5 is a diagram of example components of a device associated with transferring an authentication state from a digital channel to an agent channel, in accordance with some embodiments of the present disclosure.

FIG. 5 is a diagram of example components of a device 500 associated with transferring an authentication state from a digital channel to an agent channel. Device 500 may correspond to the server device 410, the user device 420, the call center device 430, and/or the database 440. In some implementations, the server device 410, the user device 420, the call center device 430, and/or the database 440 may include one or more devices 500 and/or one or more components of device 500. As shown in FIG. 5, device 500 may include a bus 510, a processor 520, a memory 530, an input component 540, an output component 550, and a communication component 560.

Bus 510 may include one or more components that enable wired and/or wireless communication among the components of device 500. Bus 510 may couple together two or more components of FIG. 5, such as via operative coupling, communicative coupling, electronic coupling, and/or electric coupling. Processor 520 may include a central processing unit, a graphics processing unit, a microprocessor, a controller, a microcontroller, a digital signal processor, a field-programmable gate array, an application-specific integrated circuit, and/or another type of processing component. Processor 520 may be implemented in hardware, firmware, or a combination of hardware and software. In some implementations, processor 520 may include one or more processors capable of being programmed to perform one or more operations or processes described elsewhere herein.

Memory 530 may include volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 may include one or more memories that are coupled (e.g., communicatively coupled) to one or more processors (e.g., processor 520), such as via bus 510. Communicative coupling between a processor 520 and a memory 530 may enable the processor 520 to read and/or process information stored in the memory 530 and/or to store information in the memory 530.

Input component 540 may enable device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 may enable device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
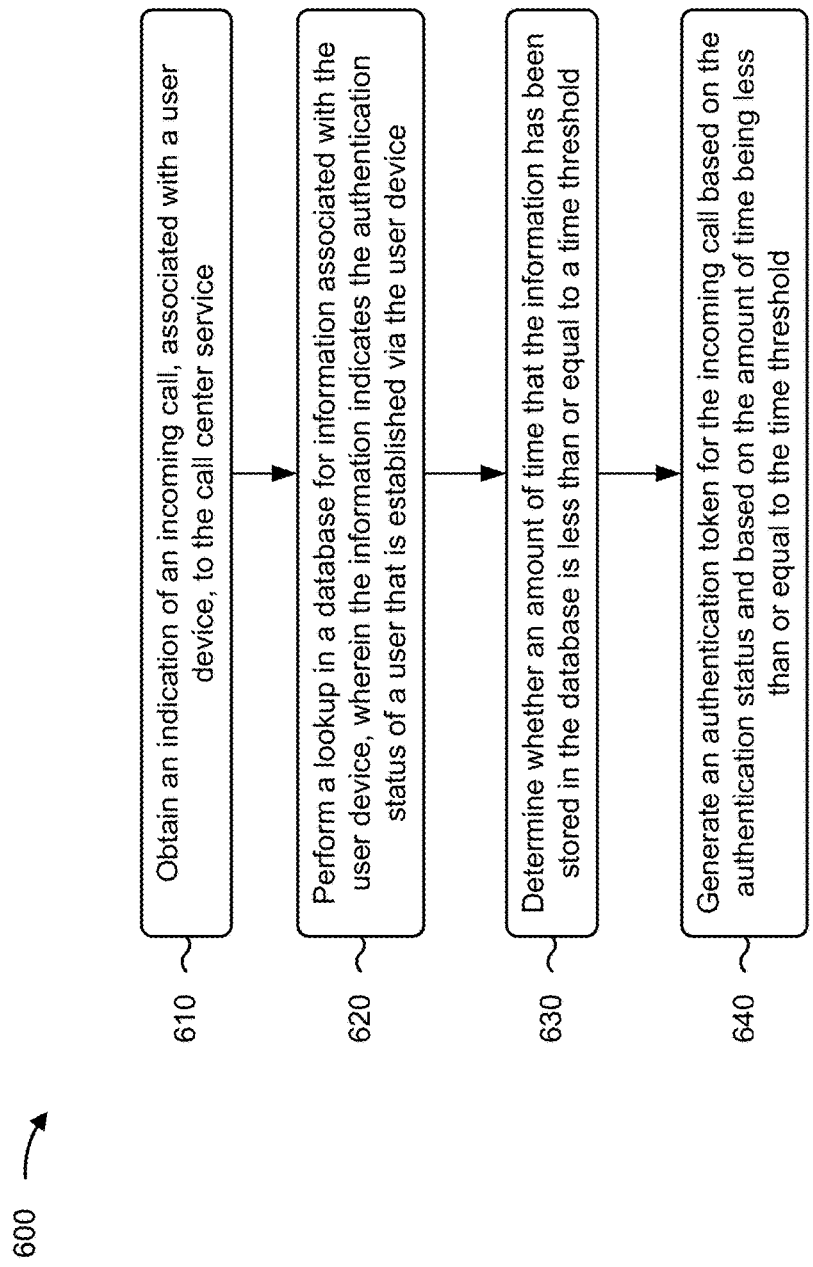
FIG. 6 is a flowchart of an example process associated with transferring an authentication state from a digital channel to an agent channel, in accordance with some embodiments of the present disclosure.

FIG. 6 is a flowchart of an example process 600 associated with transferring an authentication state from a digital channel to an agent channel. In some implementations, one or more process blocks of FIG. 6 may be performed by the server device 410. In some implementations, one or more process blocks of FIG. 6 may be performed by another device or a group of devices separate from or including the server device 410, such as the user device 420, the call center device 430, and/or the database 440, among other examples. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include obtaining an indication of an incoming call, associated with a user device, to the call center service (block 610). For example, the server device 410 (e.g., using processor 520 and/or memory 530) may obtain an indication of an incoming call, associated with a user device, to the call center service, as described above in connection with reference number 130 of FIG. 1B. As an example, a user device may initiate a call or other communication to a call center service (e.g., a call center). The server device may obtain an indication of the call. For example, the server device may obtain an indication of a phone number or other identifier of the user device making the call.

As further shown in FIG. 6, process 600 may include performing a lookup in a database for information associated with the user device (block 620). In some implementations, the information indicates the authentication status of a user that is established via the user device. For example, the server device 410 (e.g., using processor 520 and/or memory 530) may perform a lookup in a database for information associated with the user device, as described above in connection with reference number 135 of FIG. 1B. In some implementations, the information indicates the authentication status of a user that is established via the user device. As an example, an authentication procedure may be performed via the user device (e.g., as described above in connection with reference number 105 of FIG. 1A). An event may occur via a digital channel (e.g., via the user device). Information associated with the event may be stored in the database in connection with a phone number or other identifier of the user device. The server device may perform a lookup operation to determine whether any events associated with the phone number or other identifier of the user device making the call are stored in the database.

As further shown in FIG. 6, process 600 may include determining whether an amount of time that the information has been stored in the database is less than or equal to a time threshold (block 630). For example, the server device 410 (e.g., using processor 520 and/or memory 530) may determine whether an amount of time that the information has been stored in the database is less than or equal to a time threshold, as described above in connection with reference number 145 of FIG. 1B. As an example, the server device may identify a timestamp or other indication of an amount of time associated with an event that is stored in the database (e.g., and that is associated with the phone number or other identifier of the user device making the call). The server device may determine whether an amount of time from the event being stored in the database and the call being made satisfies the time threshold. For example, the time threshold may be associated with an amount of time, such as 30 seconds, 1 minute, 3 minutes, 5 minutes, or another amount of time.

As further shown in FIG. 6, process 600 may include generating an authentication token for the incoming call based on the authentication status and based on the amount of time being less than or equal to the time threshold (block 640). For example, the server device 410 (e.g., using processor 520 and/or memory 530) may generate an authentication token for the incoming call based on the authentication status and based on the amount of time being less than or equal to the time threshold, as described above in connection with reference number 150 of FIG. 1C. As an example, the server device may determine that the amount of time is less than or equal to the time threshold (e.g., in addition to other considerations described in more detail in connection with FIGS. 1A-1C). Therefore, the server device may determine that the authentication state that is established via the digital channel (e.g., via the user device) is to be transferred to the agent channel. The server device may determine an authentication level to be associated with the authentication token based on the authentication status (e.g., established via the digital channel). Generating the authentication token for the call may enable access, for the incoming call, to one or more services or functions associated with the call center service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C, 2, and 3. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for transferring an authentication state from a digital channel to an agent channel, the system comprising:
   one or more memories; and
   one or more processors, coupled to the one or more memories, configured to:
   obtain, at a first time, an indication of an incoming call, associated with a user device, to a call center service that is associated with the agent channel,
      wherein the user device is associated with the digital channel;
   determine, at a second time, whether an event associated with the user device is stored in a database associated with the call center service, wherein the event indicates the authentication state of a user that is established via the digital channel and the user device, and
wherein the authentication state indicates at least one of: whether the user is authenticated, a technique used to authenticate the user, or a level of authentication;
determine whether an amount of time between the first time and the second time satisfies a time threshold; and
perform an action to enable access, for the incoming call, to one or more services or functions associated with the call center service based on the authentication state and based on the amount of time satisfying the time threshold.

2. The system of claim 1, wherein the action includes granting an authentication token level for the incoming call to enable the access to the one or more services or functions, and
wherein the access is provided to a call center device associated with the call center service.

3. The system of claim 1, wherein the event is associated with a user interaction with an application executing on the user device, and
wherein the user interaction is associated with a user input associated with a deep link that causes the incoming call to the call center service to be initiated.

4. The system of claim 1, wherein the one or more processors, to determine whether the event associated with the user device is stored in the database, are configured to:
query the database using an identifier of the user device or a phone number associated with the user device; and
determine whether the event is stored in the database based on querying the database.

5. The system of claim 1, wherein the event indicates a first phone number associated with the event; and wherein the one or more processors are further configured to:
compare the first phone number to a second phone number associated with the incoming call, and
wherein performing the action is further based on the first phone number matching the second phone number.

6. The system of claim 5, wherein the first phone number is determined using a silent mobile authentication technique.

7. The system of claim 1, wherein the one or more processors are further configured to:
obtain an indication of a first code provided as part of the incoming call; and
compare the first code to a second code that is associated with the user device, and
wherein performing the action is further based on the first code matching the second code.

8. The system of claim 7, wherein the second code is a time-based one-time password.

9. The system of claim 1, wherein the incoming call is associated with a voice over internet protocol (VoIP) connection associated with the digital channel, and
wherein performing the action is further based on the incoming call being associated with the VoIP connection.

10. A method of transferring an authentication status of a user for a call center service, comprising:
obtaining, by a server device, an indication of an incoming call, associated with a user device, to the call center service;
performing, by the server device, a lookup in a database for information associated with the user device,
wherein the information indicates the authentication status is established via the user device;
determining, by the server device, whether an amount of time that the information has been stored in the database is less than or equal to a time threshold; and
generating, by the server device, an authentication token for the incoming call based on the authentication status and based on the amount of time being less than or equal to the time threshold.

11. The method of claim 10, further comprising:
performing an action to enable a call center device to access, for the incoming call, one or more services or functions associated with the call center service based on the authentication token.

12. The method of claim 10, wherein the information indicates context information associated with the incoming call, the method further comprising:
providing, to a call center device, the context information associated with the incoming call.

13. The method of claim 10, wherein the authentication status is established via an authentication procedure associated with an application executing on the user device.

14. The method of claim 10, wherein obtaining the indication of the incoming call comprises:
obtaining an indication of a code associated with the incoming call, and
wherein generating the authentication token for the incoming call is further based on the code matching a unique identifier associated with the user device.

15. The method of claim 10, wherein the incoming call is to a phone number from a set of phone numbers associated with the call center service, and
wherein generating the authentication token for the incoming call is further based on the phone number being a phone number designated for use by the user device or an application executing on the user device.

16. The method of claim 10, wherein the authentication token is associated with an authentication level, and
wherein the authentication level is based on a type or level of authentication indicated by the authentication status.

17. A non-transitory computer-readable medium storing a set of instructions, the set of instructions comprising:
one or more instructions that, when executed by one or more processors of a device, cause the device to:
obtain, at a first time, an indication of an incoming communication, associated with a user device, to a customer service center;
determine whether an event, that occurred at a second time, associated with the user device is stored in a database associated with the customer service center,
wherein the event indicates an authentication state of a user that is established via the user device; and
wherein the authentication state indicates at least one of: whether the user is authenticated, a technique used to authenticate the user, or a level of authentication;
determine whether an amount between the first time and the second time satisfies a time threshold; and
perform an action to enable access, for the incoming communication, to one or more services or functions associated with the customer service center based on the authentication state and based on the amount of time satisfying the time threshold.

18. The non-transitory computer-readable medium of claim 17, wherein the access is provided to a call center device associated with the customer service center.

19. The non-transitory computer-readable medium of claim 17, wherein the event is associated with a user interaction with an application executing on the user device, and wherein the user interaction is associated with a user input associated to an option that causes the incoming communication to be initiated.

20. The non-transitory computer-readable medium of claim 17, wherein the one or more instructions, that cause the device to determine whether the event associated with the user device is stored in the database, cause the device to:

query the database using an identifier of the user device or a phone number associated with the user device; and determine whether the event is stored in the database based on querying the database.

\* \* \* \* \*